United States Patent [19]
Hawash et al.

[11] Patent Number: 5,188,319
[45] Date of Patent: Feb. 23, 1993

[54] CLAMP FOR HOSES, TUBING AND/OR ELECTRICAL HARNESSES

[75] Inventors: Suheal N. Hawash; Terry E. Hively, both of Fort Wayne, Ind.

[73] Assignee: Navistar International Transportation Corp., Chicago, Ill.

[21] Appl. No.: 825,688

[22] Filed: Jan. 27, 1992

[51] Int. Cl.$^5$ ............................................. F16L 3/00
[52] U.S. Cl. ................................. 248/68.1; 248/74.3; 248/71
[58] Field of Search ............ 248/68.1, 74.3, 74.4, 248/74.2, 71, 74.1

[56] References Cited

U.S. PATENT DOCUMENTS

| | | | |
|---|---|---|---|
| 2,453,319 | 11/1948 | Hollyday, Jr. | 248/68.1 X |
| 3,346,688 | 10/1967 | Fields | 248/74.3 X |
| 4,973,014 | 11/1990 | Daigle et al. | 248/74.4 X |

FOREIGN PATENT DOCUMENTS

| | | | |
|---|---|---|---|
| 576249 | 5/1959 | Canada | 248/74.4 |
| 589618 | 12/1959 | Canada | 248/74.3 |

*Primary Examiner*—Alvin C. Chin-Shue
*Attorney, Agent, or Firm*—Dennis K. Sullivan

[57] ABSTRACT

A clamp securely clamps together a plurality of tubular structures such as tubing, hoses and electrical harnesses. The tubular structures need not be of the same diameter and can be up to at least 2 inches in diameter. The clamp includes a planar base portion having two upright end flanges which each include a clasp element projecting outwardly therefrom. A rubber strap is secured over the base portion, and is engaged to the base portion over the top of the flanges at each end thereof by means of openings therein engaging a respective clasp element.

8 Claims, 1 Drawing Sheet

CLAMP FOR HOSES, TUBING AND/OR ELECTRICAL HARNESSES

BACKGROUND OF THE INVENTION

The present invention relates to a clamp for securely clamping together a plurality of hoses, tubing, and/or electrical harnesses which need not be of uniform diameter, and allowing their securement to a surface, such as a surface within the engine compartment of a vehicle.

THE PRIOR ART

Heretofore, metal or plastic clamps, washers, nuts and bolts have been required for fixing a plurality of tubes, hoses, wire harnesses, etc. to a surface in an engine compartment of a vehicle. This has been laborious and time consuming and does not provide universal clamping of elongated structures of various sizes within a single clamp. Others have provided self-locking plastic clamps but these tend to require uniform diameter tubes or hose.

As will be described in greater detail hereinafter, the clamp of the present invention includes a body portion for mounting to a surface with a rubber strap securable thereto which can accommodate within the confines thereof a plurality of various sized tubular elements passing therethrough with an outer diameter of up to two inches, the strap being quickly securable to the body portion with only one hand.

SUMMARY OF THE INVENTION

According to the invention, there is provided a clamp including an elongate planar base body having mounting holes for attachment to a supporting surface and including two upwardly extending flanges disposed at each end to define with the base body a trough within which tubes, hoses, or electrical harnesses may be contained. Each flange includes an outwardly projecting downwardly opening L-shaped clasp thereon which engages within an opening disposed at each end of an elastomeric strap which is secured thereby to the flanges of the body portion to form an upper surface for the clamp, the strap being spaced a predetermined distance above the planar base by the upper ends of the flanges.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
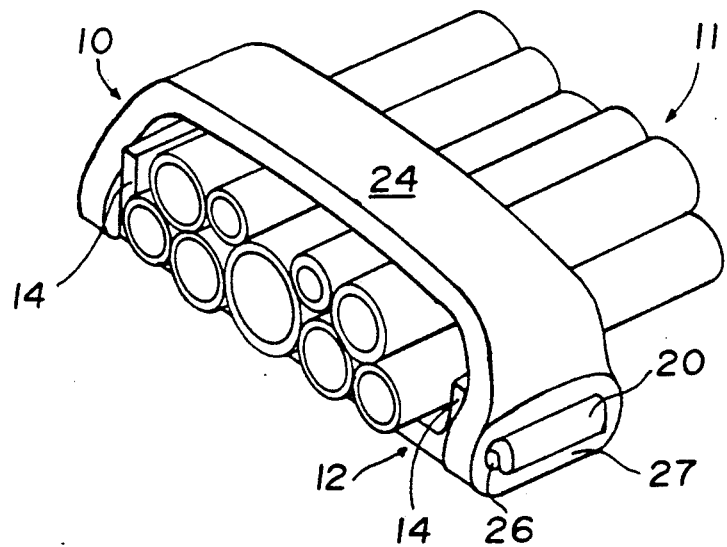
FIG. 1 is a perspective view of the clamp of the present invention shown secured about a plurality of various sized tubular structures.
Figure 2:
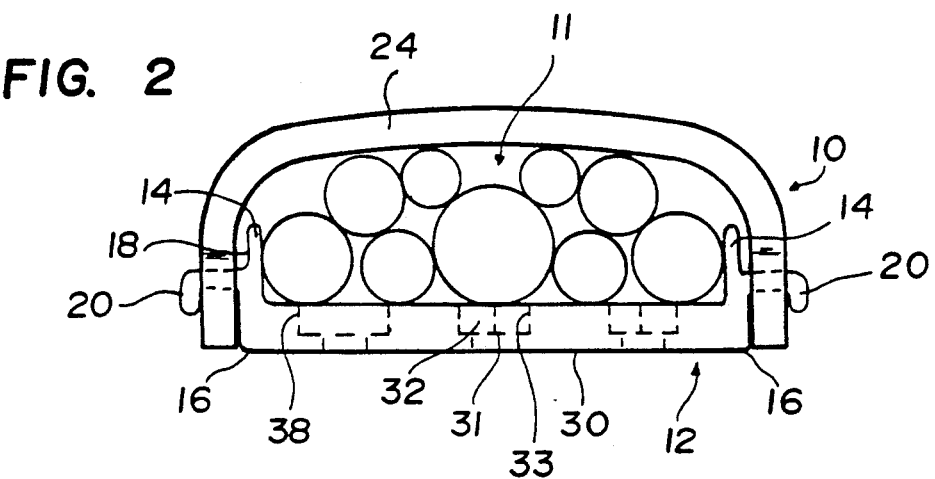
FIG. 2 is a side view of the clamp of FIG. 1.
Figure 3:
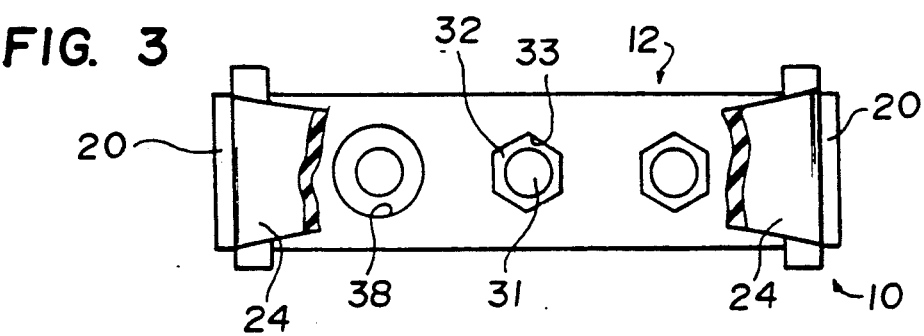
FIG. 3 is a top plan view of the clamp with a center portion of a strap thereof broken away to show means for mounting a body portion of the clamp to supporting structure therebeneath.

Referring now to the drawings in greater detail, there is illustrated in the drawings a clamp 10 made in accordance with the teachings of the present invention.

As shown, the clamp 10 is configured to receive and frictionally engage therein a plurality of elongate structures 11, such as hoses, tubing, and/or electrical harnesses that need not be of uniform diameter. The clamp 10 as will be further described hereinafter, is capable of simultaneously engaging therein a plurality of such nonuniform structures 11 ranging in size from ¼ inch in diameter up to 2 inches in diameter, and provides for secure clamping together of the structures 11.

The clamp 10 includes an elongate planar base portion 12 which has an upstanding terminal flange 14 at each longitudinal end 16 thereof to define the lateral limits of a base trough within which some of the structures 11 may be received, others being stacked thereon as shown. Each flange 14 has a laterally outward surface 18 on which an outwardly projecting, downwardly opening, L-shaped clasp element 20 is positioned.

The clamp 10 further includes an elongated elastomeric tie-down strap 24 which is of a longitudinal extent to extend across the base portion 12 and, under tension, engage the clasp elements 20 on the flanges 14. This engagement is created when a terminal opening 26 provided in each longitudinal end 27 of the strap 24 is secured over a respective clasp element 20 of the base portion 12. The strap 24 is reinforced in an area surrounding the periphery of each terminal opening 26.

In use, the base portion 12 of the clamp 10 is fixed to a underlying surface, such as within an engine compartment of a vehicle. Various methods of mounting the base portion 12 are available, such as by means of hex head bolts and nuts, carriage bolts, pine tree fasteners, snap fit fasteners, or by the use of an adhesive on an undersurface 30 of the base portion 12.

Once fixed to the underlying surface, the plurality of structures 11 to be fixed in position by the clamp 10 are laid across the base portion 12, in the trough area between the flanges 14, and a first opening 26 in one end 27 of the strap 24 is engaged to a corresponding clasp element 20. The remainder of the strap 24 is then brought over and across the area between the flanges 14 and then fixed by means of the second opening 26 at the other end 27 to the second latch element 20, securing the plurality of structures 11 between the strap 24 and the base portion 12.

Once the structures 11 are positioned for securement between the flanges 14, the strap 24 is easily stretched into engagement with the base portion 12 as described using one hand, simplifying the clamping procedure significantly and maintaining the structures 11 within the trough or in engagement with other structures within the trough.

The base portion 12, as stated previously, is capable of being connected to an underlying surface in various manners some of which are shown in the drawings. For instance, the base portion 12 may be engaged by means of hex head bolts 31 and nuts. To create an unobstructed engagement, the base portion 12 may be formed for inset positioning of a head 32 of the bolt 31 therein.

In one embodiment, the base portion 12 may be drilled out to provide a countersunk bore portion 33 which is hexagonal and of a diameter which will snugly engage the head 32 of the hex head bolt 31. Then, the head 32 of the bolt 31 is held against turning when a nut is threaded onto the bolt 31.

As a second embodiment, a countersunk bore portion 38 may be drilled to create a circular diameter which is capable of receiving therein not only the head 32 of the bolt 31 but a socket (not shown) engaged therearound as well. In this embodiment, the socket would be used to hold the bolt head 32 in place during engagement of a nut onto the bolt 31. With this form of countersunk bore portion 33, 38 being provided, the bolt head 32 is seated in a manner to be recessed within the base portion 12 and does not extend above the level thereof, eliminating any interference it may otherwise produce.

The base portion 12 may be inexpensively molded of plastic and the rubber strap 24, when simply engaged thereto as defined above, provides secure clamping therein for a wide variety of structures 11 which need not be of uniform diameter to assure such secure engagement.

As described above, the clamp has a number of advantages, some of which have been described above and others of which are inherent in the invention. Also modifications can be proposed to the clamp without departing from the teachings herein. Accordingly, the scope of the invention is only to be limited as necessitated by the accompanying claims.

What is claimed is:

1. A clamp for securely clamping together a plurality of structures of differing cross-sectional sizes, the clamp comprising a base member, said base member including an elongate planar portion having an upright terminal flange disposed at each longitudinal end thereof and extending upwardly therefrom to a distal end, said planar portion and said flanges defining a trough for containing said structures, each flange including a clasp element disposed on an intermediate portion of an outer surface thereof and projecting laterally outwardly therefrom, and an elongated elastic strap member including an opening in each longitudinal end thereof, said strap element openings being engaged respectively over said clasp elements and the intermediate portion of said strap being stretched under tension between and over the distal ends of flanges in a manner overlying the planar base portion therebetween.

2. The clamp of claim 1 wherein said base member is made of plastic.

3. The clamp of claim 2 wherein said base portion includes countersunk bores therein for receiving fastening means therewithin in an inset manner.

4. The clamp of claim 3 wherein said strap is made of rubber.

5. The clamp of claim 4 wherein said strap is elongate and includes an opening in each end thereof.

6. The clamp of claim 1 wherein said outwardly projecting clasp elements are L-shaped and open downwardly.

7. The clamp of claim 6 having a longitudinal dimension sufficient to engage a plurality of tubular structures of various diameters.

8. The clamp of claim 7 and said flanges having a height sufficient to contain a plurality of tubular structures of various diameters within said trough.

* * * * *